A. PTASENSKI.
TOOTHED HARROW.
APPLICATION FILED FEB. 2, 1915.
1,148,045.
Patented July 27, 1915.
2 SHEETS—SHEET 2.
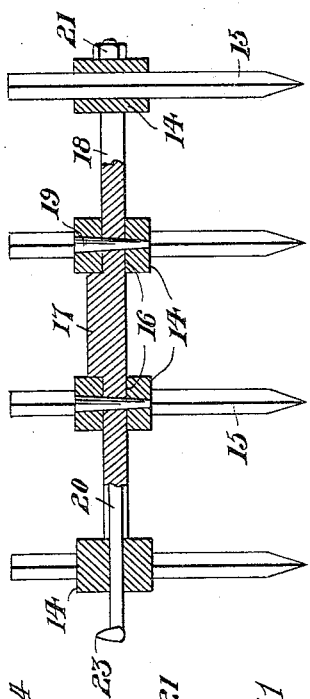
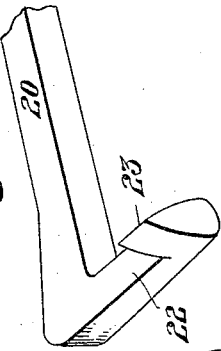
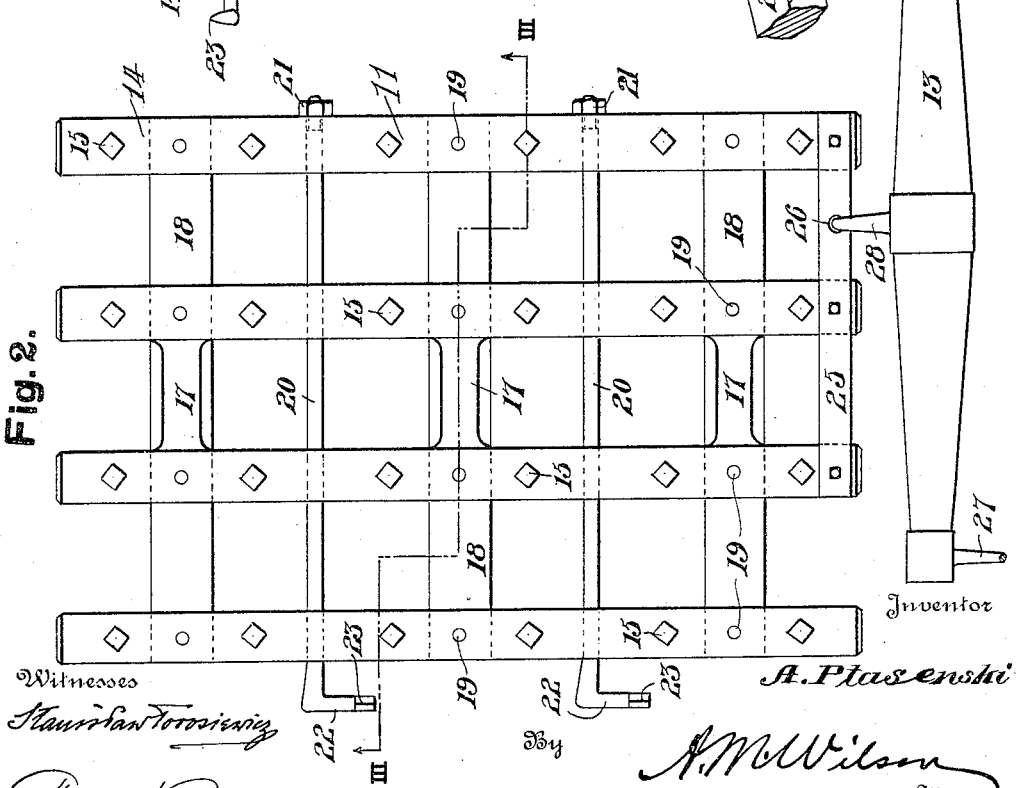
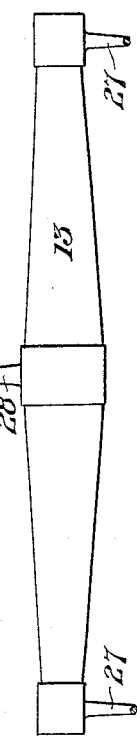

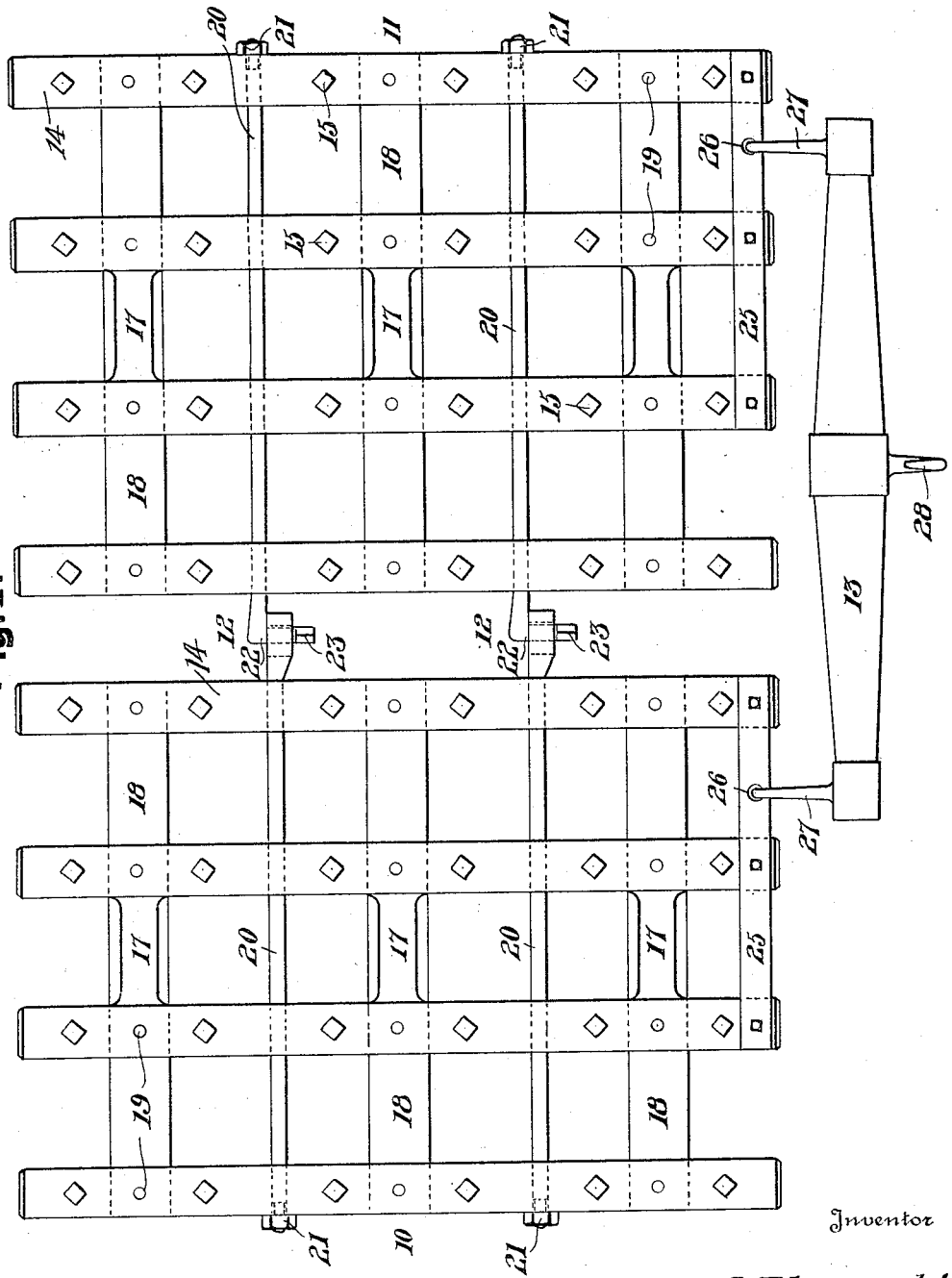

UNITED STATES PATENT OFFICE.

ANTHONY PTASEŃSKI, OF FORCE, PENNSYLVANIA.

TOOTHED HARROW.

1,148,045.    Specification of Letters Patent.    Patented July 27, 1915.

Application filed February 2, 1915. Serial No. 5,701.

*To all whom it may concern:*

Be it known that I, ANTHONY PTASEŃSKI, a citizen of the United States, residing at Force, in the county of Elk and State of Pennsylvania, have invented certain new and useful Improvements in Toothed Harrows, of which the following is a specification.

This invention relates to certain new and useful improvements in toothed harrows.

The primary object of this invention is to provide an agricultural implement designed for leveling plowed ground and formed in two sections, one of which may be used when a single animal is employed for drawing the device, while two of the parts are hinged together for concurrent use when more than one draft animal is employed.

A further object of the device is to provide harrow units identical in construction and provided with a ready means for hinging the units together and being adapted to be dragged over the ground in a line slightly diagonal of the units.

A still further object is to provide hinged harrow units, each formed of longitudinal and transverse bars that are interlocked together and including means for holding the bars in assembled position.

With these general objects in view and others that will appear as the nature of the invention is better understood, the same consists in the novel combination and arrangement of parts hereinafter more fully described, illustrated in the accompanying drawings, and pointed out in the appended claims.

In the drawings forming a part of this application and in which like designating characters refer to corresponding parts throughout the several views, Figure 1 is a top view of the device with two units hinged together and the single tree attached thereto. Fig. 2 is a top plan view of a single one of the units with the single tree attached to the same. Fig. 3 is a transverse vertical sectional view taken upon line III—III of Fig. 2. Fig. 4 is an enlarged detail view of the end portion of one of the hinge hooks employed and, Fig. 5 is a similar view of the loop or eye end of the coöperating hinged member.

Referring more in detail to the drawings, the device shown broadly consists of two harrow units 10 and 11, identical in form and provided with separable hinges 12 and having a single tree 13 for the attachment of any desired form of draft means for dragging the harrow over the ground.

Each of the harrow units is formed of a plurality of longitudinally arranged bars 14 having the pointed ground engaging spikes 15 secured therethrough, while the bars 14 are provided with transverse perforations 16 for sliding the same upon the opposite ends of parallel cross rods 17 which have reduced opposite ends 18 adapted for the reception of such bars, it being noted that when the bars are placed in position, the same are rigidly secured by means of locking pins 19. This arrangement provides for the easy making up or repair of a unit as the bars may be removed after extracting the pins 19.

The hinges 12 are adapted to removably pivot the units together and these hinges are in the form of rods 20 extending transversely through the longitudinal bars 14 of the units and having their outer ends provided with lock nuts 21, whereby the rods 20 are firmly locked in position. The rod 20 carried by the unit 11 terminates in an angular hook 22 at the end thereof lying between the two coöperating units when assembled and this hook has a cam-shaped laterally projecting lug 23 adapted to be inserted through the loop or eye 24 upon the adjacent end of the hinged rod which is carried by the unit 10.

The loop 24 having a cross sectional shape similar to the cam lug 23 although being of slightly greater dimension allows the insertion of the said lug therethrough when the units are positioned perpendicular to each other, so that the hook 22 will then be received within the loop 24 and will serve the function of a hinged pintle when the units are normally positioned for use substantially in horizontal alinement.

Each of the units is provided with a draft strip 25 at corresponding ends thereof and sockets 26 are provided through the said strips at a point adjacent the corner of the carrying units and the usual hooks 27 of the single tree 13 are adapted to engage within the said sockets 26 whereby the two units so hinged together may be drawn over the plowed ground, it being understood that the draft means such as two horses are attached to the single central hook 28 of the single tree.

By referring to Fig. 2, it will be noted that the strip 25 of the units has the single tree 13 arranged with its central single hook 28 removably positioned within the strip socket 26, while in that instance, the draft means such as a single horse is designed to be attached to the end hooks 27 of the single tree.

It will be thus seen that a serviceable toothed harrow is provided which is easy and cheap to manufacture, and may be readily repaired, while its operative use with either one or two units renders the same capable of universal use.

While the form of the invention herein shown and described is what is believed to be the preferred embodiment thereof, it is nevertheless to be understood that minor changes may be made without departing from the spirit and scope of the invention as claimed.

What I claim as new is:—

1. A harrow unit comprising cross rods having opposite reduced ends, longitudinally-arranged bars having transverse perforations and slidably positioned in parallelism upon the said reduced ends, locking pins between the said bars and rods.

2. A harrow unit comprising cross rods having reduced ends and centers provided with abrupt shoulders, longitudinally-arranged bars having transverse perforations and slidably positioned against the abrupt shoulders of the cross rods on said reduced ends, and tapered pins locking the longitudinally-arranged bars tightly against the abrupt shoulders.

In testimony whereof I affix my signature in presence of two witnesses.

ANTHONY PTASEŃSKI.

Witnesses:
E. A. HEWETT,
B. M. SHULING.

Copies of this patent may be obtained for five cents each, by addressing the "Commissioner of Patents, Washington, D. C."